US008725394B2

United States Patent
Bahlmann et al.

(10) Patent No.: US 8,725,394 B2
(45) Date of Patent: May 13, 2014

(54) MULTI-MODAL SPEED LIMIT ASSISTANT

(75) Inventors: Claus Bahlmann, Princeton, NJ (US); Martin Pellkofer, Pentling (DE); Jan Giebel, Sigmarszell (DE); Gregory Baratoff, Wangen-Feld (DE)

(73) Assignees: Siemens Corporation, Iselin, NJ (US); Siemens Aktiengesellschaft, München (DE)

( * ) Notice: Subject to any disclaimer, the term of this patent is extended or adjusted under 35 U.S.C. 154(b) by 959 days.

(21) Appl. No.: 12/246,726

(22) Filed: Oct. 7, 2008

(65) Prior Publication Data

US 2010/0188288 A1 Jul. 29, 2010

Related U.S. Application Data

(60) Provisional application No. 60/978,470, filed on Oct. 9, 2007.

(51) Int. Cl.
  *G06F 19/00* (2011.01)
  *G06G 7/70* (2006.01)
  *G06G 7/76* (2006.01)
  *G08G 1/00* (2006.01)

(52) U.S. Cl.
  USPC ........... 701/117; 701/118; 701/119; 382/104; 382/107; 340/907; 340/936; 340/937

(58) Field of Classification Search
  USPC ........... 340/936, 937, 907; 348/113; 382/104, 382/107; 701/117–119, 507
  See application file for complete search history.

(56) References Cited

U.S. PATENT DOCUMENTS

| 7,058,206 B1 * | 6/2006 | Janssen et al. ............... 382/104 |
| 2008/0004789 A1 * | 1/2008 | Horvitz et al. ............... 701/117 |

OTHER PUBLICATIONS

LeCun, Yann et al., "Gradient-Based Learning Applied to Document Recognition", Proceedings IEEE 86 (11): 23278-2325, Nov. 1998.
Bahlmann, C., et al. "System for Traffic Sign Detection, Tracking, and Recogntion Using Color, Shape, and Motion Information", IEEE Intelligent Vehicles Symposium (IV), Las Vegas, NV, 2005.
Gavrila,D.M., "Traffic Sign Recognition Revised", Proc. of the 21st DAGM Symposium for Musterekennung, pp. 86-93, Bonn, Germany, 1999, Springer Verlag.
Keller, C., et al., "Real-time Recognition of U.S. Speed Signs", IEEE Intelligent Vehicles Symposium (IV), Eidnhoven, Netherlands, 2008.
Moutarde, F., et. al., "Robust on-vehicle real-time visual detection of American and European speed limit signs, with a modular Traffic Signs Recognition system", IEEE Intelligent Vehicles Symposium (IV), Istanbul, Turkey, Jun. 2007.

(Continued)

*Primary Examiner* — Jeffrey Shapiro
(74) *Attorney, Agent, or Firm* — Donald B. Paschburg; F. Chau & Associates, LLC

(57) ABSTRACT

A speed limit assistant (SLA) system includes a camera based SLA, a map based SLA, and a fusion unit. The camera based SLA is configured to determine a first set of probabilities for an input image, wherein the probabilities indicate how likely the image includes a discrete set of speed limit signs. The map based SLA is configured to determine a second set of probabilities for an input coordinate, wherein the probabilities indicate how likely the coordinate is to correspond to one of a discrete set of speed limits. The fusion unit is configured to perform a Bayesian fusion on the first and second set of probabilities to determine a final speed limit from the discrete set of speed limits.

14 Claims, 7 Drawing Sheets

(56) References Cited

OTHER PUBLICATIONS

Barnes, N., et al., "Real-time radial symmetry for speed sign detection", 2004 IEEE Intelligent Vehicles Symposium, University of Parma, Parma Italy, Jun. 14-17, 2004.

Platt, John C., "Probabilistic Outputs for Support Vector Machines and Comparisons to Regularized Likelihood Methods", In Advances in Large Margin Classifiers, MIT Press, 1999.

Schapire, R.E., et al., "Improved Boosting Algorithms Using Confidence-rated Predictions", Machine Learning, 37 (3): 297-336, 1999.

\* cited by examiner

| In m_SL | m_ST = RURALROAD | | | | | | | | | | | | | | | |
|---|---|---|---|---|---|---|---|---|---|---|---|---|---|---|---|---|
| | 5 | 10 | 20 | 30 | 40 | 50 | 60 | 70 | 80 | 90 | 100 | 110 | 120 | 130 | no-limit | NONE |
| 5 | a | | | | | | | | | | | | | | | |
| 10 | | a | | | | | | | | | | | | | | |
| 20 | | | a | | | | | | | | | | | | | |
| 30 | | | | a | | | | | | | | | | | | |
| 40 | | | | | a | | | | | | | | | | | |
| 50 | | | | | | a | | | | | | | | | | |
| 60 | | | | | | | a | | | | | | | | | |
| 70 | | | | | | | | b | | | | | | | | |
| 80 | | | | | | | | | a | | | | | | | |
| 90 | | | | | | | | | | a | | | | | | a |
| 100 | | | | | | | | | | | b | | | | o | |
| 110 | | | | o | | | | | | | | o | | | o | |
| 120 | | | | | | | | | | | | | o | | | |
| 130 | | | | | | | | | | | | | | o | | |
| 5-end | | | o | | | | | | | | o | | | | o | a |
| 10-end | | | | | | | | | | | | | | | | |
| 20-end | | | | | | | | | | | | | | | | |
| 30-end | | | | | | | | | | | | | | | | |
| 40-end | | | | | o | | | | | | o | | | | o | a |
| 50-end | | | | | | | | | | | | | | | | |
| 60-end | | | | | | | | | | | | | | | | |
| 70-end | | | | | | | | | | | | | | | | |
| 80-end | | | | | | | | | | | | | | | | |
| 90-end | | | | | | | | | | | | | | | | |
| 100-end | | | | | o | | | | | | o | | | | o | o |
| 110-end | | | | | | | | | | | | | | | | |
| 120-end | | | | | | | | | | | | | | | | |
| 130-end | | | | | | | | | | | | | | | | |
| any-end | | | | | o | | | | | | a | | | | o | a |

FIG. 2B

MULTI-MODAL SPEED LIMIT ASSISTANT

CROSS-REFERENCE TO RELATED APPLICATIONS

This application claims priority to U.S. Provisional Application No. 60/978,470, filed on Oct. 9, 2007, the disclosure of which is incorporated by reference herein.

BACKGROUND OF THE INVENTION

1. Technical Field

The present disclosure relates to speed limit assistant, and more particularly, to a speed limit assistant that uses both information from a camera and a global positioning system.

2. Discussion of Related Art

The technology of speed limit assistants (SLAs) has emerged as an important application for automotive advanced driver assistant systems (ADAS). The aim of such systems is to inform or warn the driver about effective speed limits, or in a more active setting, supplement an adaptive cruise control (ACC) system. Conventional solutions for SLAs use one of two different technologies: (i) camera based speed sign recognition or (ii) digitized maps with a global positioning system (GPS) interface.

Camera based speed sign recognition aims at detecting and classifying speed limit signs in image sequences. Camera sensors are becoming increasingly cheap and ubiquitous in automobiles. Since cameras are extremely versatile, camera based speed sign recognition is particularly attractive when combined with additional front facing camera ADAS applications, such as those involving the detection of lane markers, vehicles, or pedestrians.

One conventional camera based speed sign recognition system uses a two stage approach. In the first stage, image frames are scanned for possible sign occurrences using a detection algorithm (e.g., based on geometric or color information), and speed sign hypotheses are generated for regions with sufficient sign evidence. In the second stage, these hypotheses are verified and categorized using a statistical classifier. The classifier may be also able to eliminate false alarms from the first stage, based on the classifier's confidence value. However, the accuracy of this system is effected by a number of environmental factors. For example, factors such as adverse lighting (e.g., bright sunlight, complete darkness) and adverse weather (e.g., rain, snow) conditions can impede the accuracy of the system in correctly recognizing speed limit signs.

The second class of SLA technologies relies on a digitized map of speed limit zones, which, in combination with a GPS sensor, can provide the speed limit for the current vehicle position. The cost of such solutions is becoming more feasible, as an increasing number of vehicles are being equipped with navigation systems, and hence, a GPS sensor.

However, the accuracy of the GPS based system depends heavily on the accuracy of the provided map data. Since available maps are static, the GPS based system fails to provide the correct speed limits if speed limits change over time. For example, some modern traffic systems make use of variable message signs, which dynamically modify speed limits based on the current weather and/or traffic conditions. Further, construction zones require authorities to temporally lower the speed limits for the affected road section. Moreover, speed limit zones may not be completely mapped for every possible road. For example, coverage may be rather sparse for rural roads. Further, map data may only represent a snapshot at a certain time and may be outdated after a few years.

Thus, there is a need for methods and systems of assisting speed limit detection that combine information of both a camera and a GPS.

SUMMARY OF THE INVENTION

According to an exemplary embodiment of the present invention, a method of determining a speed limit includes: receiving a first probability distribution from a camera based speed limit assistant (SLA) system, receiving a second probability distribution from a global positioning system (GPS), and determining a final speed limit from a discrete set of speed limits based on the first and second probability distributions. The first probability distribution includes probabilities that an image processed by the camera based SLA corresponds to the discrete set of speed limits. The second probability distribution includes probabilities that a coordinate processed by the GPS corresponds to the discrete set of speed limits.

According to another exemplary embodiment of the present invention, a method of determining a speed limit includes: determining a type of a street that corresponds to a GPS coordinate from a discrete list of street types, determining a discrete set of speed limits that correspond to the determined street type, determining a first set of probabilities for each tuple comprising the determined road type and a corresponding one of the speed limits, receiving a second set of probabilities from a camera based speed limit assistant (SLA) system based on an image of a speed limit sign, and determining a final speed limit from the discrete set of speed limits based on the first and second set of probabilities. The second set of probabilities correspond to each of the speed limits.

According to an exemplary embodiment of the present invention, a speed limit assistant (SLA) system includes a camera based SLA, a map based SLA, and a fusion unit. The camera based SLA is configured to determine a first set of probabilities for an input image, wherein the probabilities indicate how likely the image includes a discrete set of speed limit signs. The map based SLA is configured to determine a second set of probabilities for an input coordinate, wherein the probabilities indicate how likely the coordinate is to correspond to one of a discrete set of speed limits. The fusion unit is configured to perform a Bayesian fusion on the first and second set of probabilities to determine a final speed limit from the discrete set of speed limits.

The SLA system may further include a global positioning system (GPS) to provide the coordinate. The SLA may further include a database including road segment context tuples and a probability lookup table. Each tuple may include a type of the road segment and a recommended speed limit for that type. The probability lookup table includes probabilities for each tuple for each of the discrete set of speed limits. The probabilities of the lookup table that correspond to speed limits above the recommended speed limit may be set to a first value, the probabilities of the lookup table that correspond to speed limits below the recommended speed limit may be set to a second value, and the probabilities of the lookup table that correspond to speed limits equal to the recommended speed limit may be set to a third value. The third value may exceed the second value and the second value may exceed the first value.

The fusion unit may perform the Bayesian fusion by multiplying the first and second probabilities for each of the corresponding speed limits to generate product values and setting the final speed limit to the speed limit corresponding to the highest generated product value.

According to another exemplary embodiment of the present invention, a method of determining a speed limit includes: determining a recommended speed limit for a global positioning system (GPS) coordinate, determining a first set of probabilities for a discrete set of speed limits at and below the recommended speed limit, receiving a second set of probabilities from a camera based speed limit assistant (SLA) system based on an image of a speed limit sign, and determining a final speed limit from the discrete set of speed limits based on the first and second set of probabilities. The second set of probabilities correspond to each of the speed limits

BRIEF DESCRIPTION OF THE DRAWINGS

Exemplary embodiments of the invention can be understood in more detail from the following descriptions taken in conjunction with the accompanying drawings in which:

FIGS. 2A and 2B respectively illustrate exemplary tables that may be used to model probabilities for detecting speed limits according to an exemplary embodiment of the present invention;

DETAILED DESCRIPTION OF THE EXEMPLARY EMBODIMENTS

In general, exemplary embodiments for systems and methods for assisting in a detection of a speed limit will now be discussed in further detail with reference to illustrative embodiments of FIGS. 1-6. This invention may, however, be embodied in different forms and should not be construed as limited to the embodiments set forth herein. Rather, these embodiments are provided so that this disclosure will be thorough and complete, and will fully convey the scope of the invention to those skilled in the art.

It is to be understood that the systems and methods described herein may be implemented in various forms of hardware, software, firmware, special purpose processors, or a combination thereof. In particular, at least a portion of the present invention may be implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures may be implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
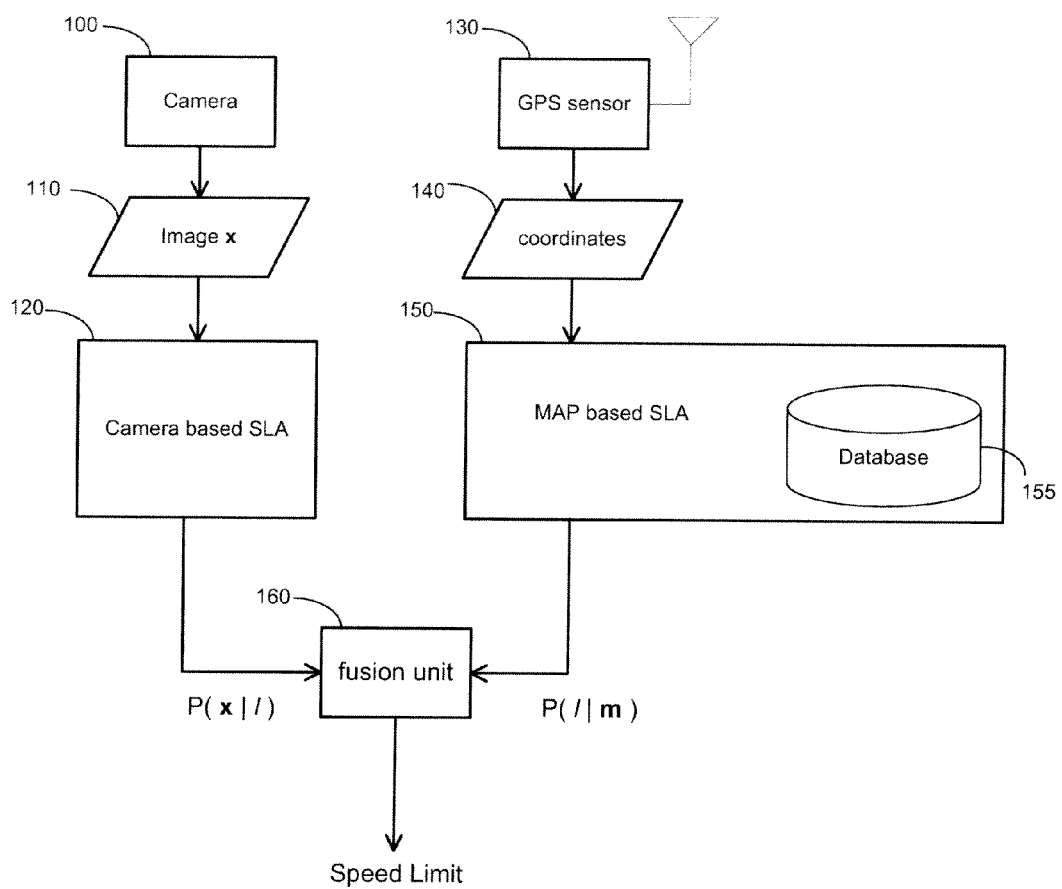
FIG. 1 illustrates a high-level block diagram of a system of detecting a speed limit, according to an exemplary embodiment of the present invention.

FIG. 1 illustrates a high-level block diagram of a system of detecting a speed limit, according to an exemplary embodiment of the present invention. Referring to FIG. 1, the system includes a camera 100, a GPS sensor 130, a camera based SLA 120, a map based SLA 150, and a fusion unit 160. The camera based SLA 120 returns a probability distribution $P(x|l)$ associated with whether an input image x received from the camera 100 is likely to be that of a particular speed limit sign. The map based SLA 150 returns a probability distribution $P(l|m)$ associated with whether the coordinates 140 received from the GPS sensor 130 are likely to correspond to a particular speed limit. The fusion unit 160 determines the most likely speed limit by performing a Bayesian fusion on both of the probability distributions $P(x|l)$ and $P(l|m)$.

The camera may be mounted, for example, on a vehicle for periodically capturing images x of the road, where at least some of the images include images of speed limit signs. The camera based SLA 120 receives an input camera image x and performs a speed sign image recognition on the image to detect an instance of a speed sign class l and assigns it one of a discrete set of class labels L. For example, in a German setting, the discrete set of class labels L may include 14 different speed limit signs, their corresponding suspension signs, and a general suspension sign as exemplified by the following equation 1:

$$l \in L = \{5, 10, 20, \ldots, 130, 5\text{-end}, 10\text{-end}, \ldots, 130\text{-end}, \text{any-end}\}, \quad (1)$$

where the corresponding suspension signs contain an '-end' extension and the general suspension sign is denoted 'any-end'. A speed limit class k can be inferred from the given speed sign class l. The speed limit class k is selected from one of a discrete set of class labels K as exemplified by the following equation 2 as follows:

$$k \in K = \{5, 10, 20, \ldots, 130, \text{no-limit}\}, \quad (2)$$

where each speed limit class k corresponds to a different one of the possible speed limits for each of the above signs.

The speed sign image recognition performed by the camera based SLA 120 may employ a statistical pattern classifier. For example, the classifier may provide a score $u_l(x)$ that is proportional to the likelihood that an image x is a particular speed limit sign l of the discrete set of speed limit signs L, as exemplified by the following equation 3:

$$u_l(x) \alpha p(x|l), l \in \{1, \ldots L\}, \quad (3)$$

where the score $\mu_l(x)$ is proportional to the likelihood $p(x|l)$. The score $u_l(x)$ may also be proportional to the posterior probability $p(l|x)$ because it can be related to $p(x|l)$ via Bayes' rule $p(l|x) \alpha P(l)_p(x|l)$. However, exemplary embodiments of the present invention are not limited to maximum-a-posteriori classifiers, and may instead include polynomial, adaboost, or multi-layer percepton classifiers. While support vector machine classifiers do not directly provide a probabilistic output, such probabilities may be estimated during post-processing using logistic regression.

The map based SLA 150 may include a database 155 for storing digital maps. Speed limit zones may be represented by a dividing a network of roads of the maps into road segments. The database 155 may further provide context tuples m for each road segment, a discrete set of street types and corresponding speed limits, and a corresponding table of probabilities (e.g., a lookup table). Each context tuple m includes a street type $m_{st}$ and a speed limit $m_{sl}$. The discrete set of street types $M_{ST}$ may be exemplified by equation 4 as follows:

$$m_{st} \in M_{ST} = \{\text{NONE,MOTORWAY,HIGHWAY,RURALROAD,URBANROAD,TRAFFCALMINGZONE}\}. \quad (4)$$

The discrete set of speed limits $M_{SL}$ may be exemplified by equation 5 as follows:

$$m_{st} \in M_{SL} = \{\text{NONE},5,10,20,30,40,50,60,70,80,90,100,110,120,130,\text{no-limit}\}. \quad (5)$$

For each of the above sets $M_{ST}$ and $M_{SL}$, a value of 'NONE' indicates that no information is available, for example, if streets have not been mapped yet. The table of probabilities may includes a probability for each of the tuples indicating a likelihood (e.g., from 0 to 1) that a recommended speed limit of a given street type (e.g., a tuple) is correct and probabilities that speed limits above and below the recommended speed limit are correct. The table may be set based on experience from those that are familiar with a particular area.

As discussed above, the fusion unit 160 determines the most likely speed limit given information from two modalities of sensor information (i.e., camera based data and gps/map based data). Given a camera image x for a speed limit sign l and the context tuple m, a maximum-a-posteriori classification paradigm assigns x to the speed limit sign class l with the highest a-posteriori probability, as exemplified by equation 6 as follows:

$$\hat{l} = \arg\max_{l} \{P(l \mid x, m)\}, \quad (6)$$

where x and in represent the two modalities of sensor information. It may not be possible to measure $P(l|x, m)$ directly. However, Bayes' rule can be used to translate $P(l|x,m)$ into functions of $p(x|l)$ and $p(l|m)$ as exemplified by the following equation 7:

$$P(l|x,m) \propto p(x|l,m)P(l|m) = p(x|l)P(l|m). \quad (7)$$

The last equality of equation 7 holds because knowledge about the road segment's street type or speed limit information does not impact the sign appearance for a particular class l. Equation 7 shows that the posterior probability decomposes into two terms: (1) $p(x|l)$ and (2) $P(l|m)$. The term $p(x|l)$ describes the speed sign appearance as provided by a camera. The term $P(l|m)$ equates to $P(l|m_{ST}, m_{SL})$ and enables a probabilistic modeling of a map/gps context.

It should be noted that the variable m in the above equations refers to the context tuple of the street segment commencing beyond the location (e.g., coordinate) of the speed sign, while the camera image x is taken when the vehicle is located in the road segment preceding this location. The terms of $p(x|l)$ and $P(l|m)$ can be synchronized by performing the fusion with a delay (e.g., a few seconds), until the vehicle has entered the new road and the new ni is known, or by projecting the context m of the next available road segment. However, if projecting cannot be accomplished (e.g., due to forks in the road), another layer of probabilistic modeling, similar to the techniques described above may be performed.

The map probabilities $P(l|m)$ may be estimated from a set of observations $\{(l^{(l)}, m^{(l)}), \ldots, (l^{(M)}, m^{(M)})\}$. However, based on the above example (e.g., equations (1), (4), and (5)), $P(l|m)$ would then correspond to a table $L*|M_{ST}|*|M_{SL}|=29*6*16=2784$ discrete probabilities, the '29' corresponding to the number of speed limit signs in equation 1, the '6' corresponding to the number of street types in equation 4, and the '16' corresponding to the number of speed limits in equation 5. Such a method of estimation could require hundreds of thousands of labeled road segments.

When this data is not available, expert knowledge and modeling assumptions can be used to assign values to $P(l/m)$. This knowledge describes which speed limits k, or consequently, speed limit signs 1, one is likely to expect, and in which context m. Instead of assigning values directly for each matrix element $P(l|m)$, a model may be defined based on a set of canonic traffic regulation rules and probabilistic assumptions, and $P(l|m)$ may be derived from this model.

This model may include country specific regulations. The following example illustrates a model that may used for German traffic regulations. However, embodiments of the present invention are not limited to use of the regulations for any particular country. The range of permitted speed limits for different street types, according to general German traffic regulations, may exemplified by the following equation 8:

for $m_{ST}$=MOTORWAY,$k \in \{60, \ldots, \text{no-limit}\}$, for $m_{ST}$=HIGHWAY,$k \in \{5, \ldots, 130\}$, for $m_{ST}$=RURALROAD,$k \in \{5, \ldots, 100\}$, for $m_{ST}$=URBANROAD,$k \in \{5, \ldots, 60\}$, for $m_{ST}$=TRAFFICCALMINGROAD,$k \in \{5, \ldots, 30\}$, $\quad (8)$ where $m_{ST}$ to the street type, following by a recommended speed limit or a recommended range of speed limits.

The model may further include rules regarding sign type. The speed limit ranges for suspension signs in the model may be simplified to a single speed limit. For example, for a suspension sign, k could always be set to a single recommended speed limit of no-limit, 130, 100, 50, or 30 for the above corresponding street types $m_{ST}$.

The model may further includes rules about the relationship between a true speed limit k and a map speed limit $m_{SL}$. For example, the model may include a rule that the true speed limit k is never higher than the map speed limit $m_{SL}$. For example, such a rule may be based on the assumption that k and $m_{SL}$ differ in constructions zones (e.g., where cautious driving is advised), in zones with variables message signs (e.g., $m_{SL}$=NONE), and on streets without map information ((e.g., $m_{SL}$=NONE)).

The model may include a rule that a speed limit sign l∈L, which corresponds to a given map speed limit $m_{SL}$ is assigned the highest probability a (e.g., $P(l|m)$=a). The model may further include a rule that all other speed limit signs l that correspond to k≠$m_{st}$ and are within the above ranges are assigned a lower probability b (e.g., $P(l|m)$=b and b<a).

Figure 2A:
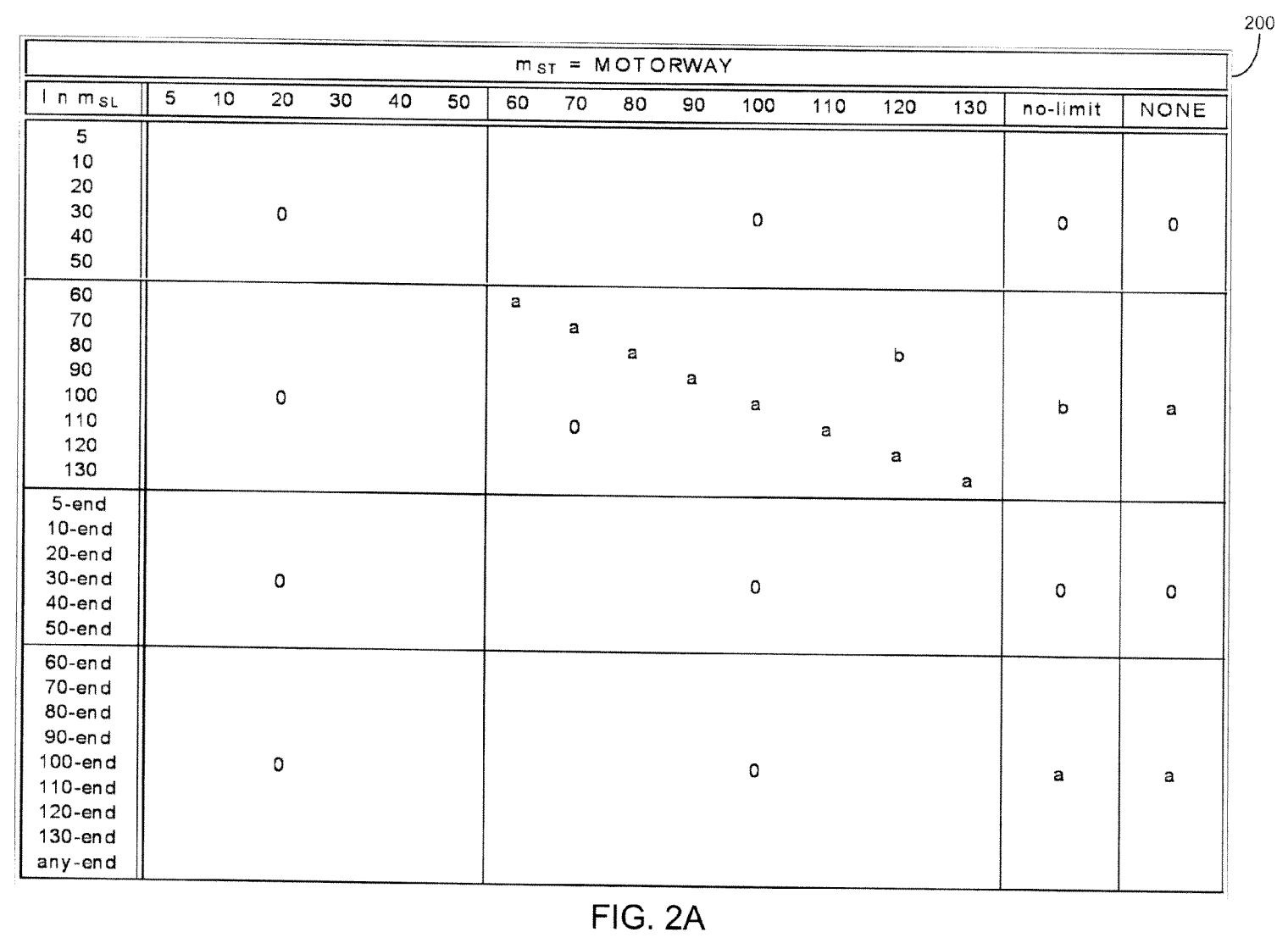

FIGS. 2A and 2B respectively illustrate exemplary tables 200 and 210 that may be used to represent $P(l|m)$ according to the above described regulations and rules. Table 200 illustrates a probability distribution for $m_{ST}$=MOTORWAY and table 210 illustrates a probability distribution for $m_{ST}$=RURALROAD. Tables for the remaining street types (e.g., HIGHWAY, URBANROAD, etc.) can be derived in a similar manner.

The table 200 incorporates some of the above rules. For example, a particular motorway road segment (e.g., 9$^{th}$ row) may have a 80 km/h speed limit, represented by a probability a, or may be actually a lower speed limit (e.g., 70 km/h), represented by probability b, but does not have a speed limit higher than 80 km/h (e.g., 90 km/h), represented by a probability of 0.

A large portion of the entries in the tables 200 and 210 have 0 values, which correspond to configurations excluded by the proposed model. In this way, a number of potential misclassifications which may arise due to camera based recognition (e.g., mistaking a 40 speed limit sign for a 90 speed limit sign in a city environment) can be prevented by taking into account the GPS map information.

The above described rule (e.g., constraint) of ensuring that a>b favors speed limit signs that are in accordance with the map information, if the statistical classifier is in doubt. The performance of the above described fusion framework depends on carefully chosen parameters a and b, and the ratio a/b. Inappropriate settings can bias the SLA towards one of the modalities. In one embodiment of the present invention, for use in a maximum-a-posteriori classifier, a ratio of a/b=1/0.7 may be used.

Figure 3:
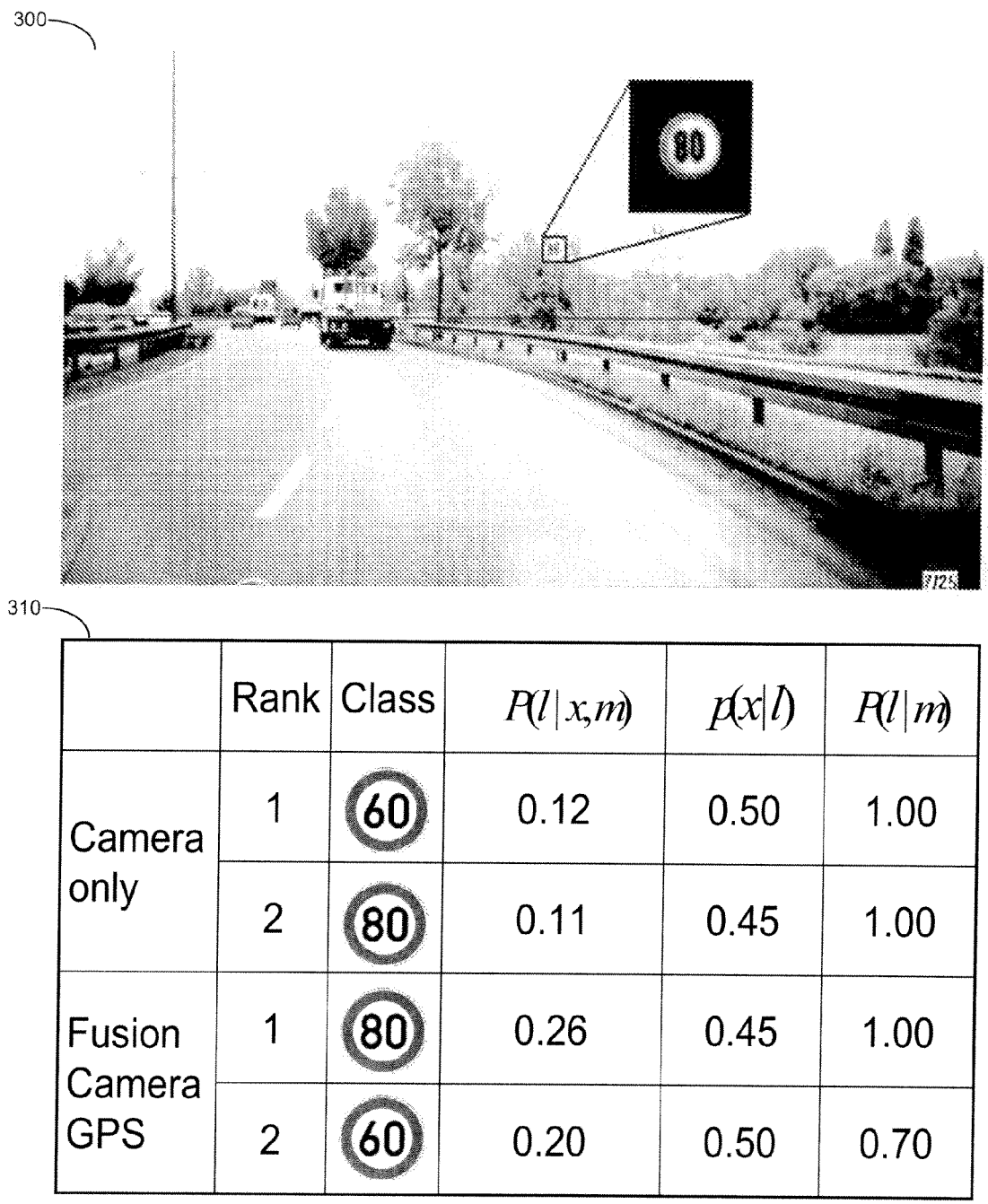
FIG. 3 illustrates a comparison between the effectiveness of a camera only based SLA and a fused SLA according to an exemplary embodiment of the present invention.

FIG. 3 illustrates a comparison between the effectiveness of a camera only based SLA and a fused SLA according to an exemplary embodiment of the present invention. Since the camera only based SLA does not incorporate data from a GPS based SLA, each of the P(l|m) are set to 1. Contrary to the displayed image 300, the camera only based SLA indicates that the speed limit is more likely to be a 60 km/h sign than a 80 km/h sign. For example, table 310 illustrates that p(x|l) is 0.5 for the 60 km/h sign and that p (x|l) is 0.45 for the 80 km/h sign. However, the gps/map based portion of the fused SLA, indicates that the speed limit is more likely to be 80 km/h. For example, table 310 illustrates that P(l|m) is 1.0 for the 80 km/h sign and that P(l|m) is 0.7 for the 60 km/h sign.

The table 310 merely lists two of the speed limit signs from a set of discrete speed limit signs for convenience. Although not shown in FIG. 3, the table 310 may have entries of each of the speed limit signs in the model (e.g., the above example uses 29). The fused probabilities P(l|x, m) may be determined by multiplying each p(x|l) and corresponding P(l|m) for each speed limit sign in the model to determine a set of product values and then normalizing the values. For example, when the sum of the resulting product values is greater than 1, the normalized values may be generated by dividing each of the product values by the sum of the product values. As shown in table 310, the fused SLA indicates that the speed limit of the image 300 is more likely to be 80 km/h. For example, table 310 illustrates that P(l|x,m) is 0.26 for 80 km/h and that P(l|x, m) is 0.20 for 60 km/h.

Figure 4:
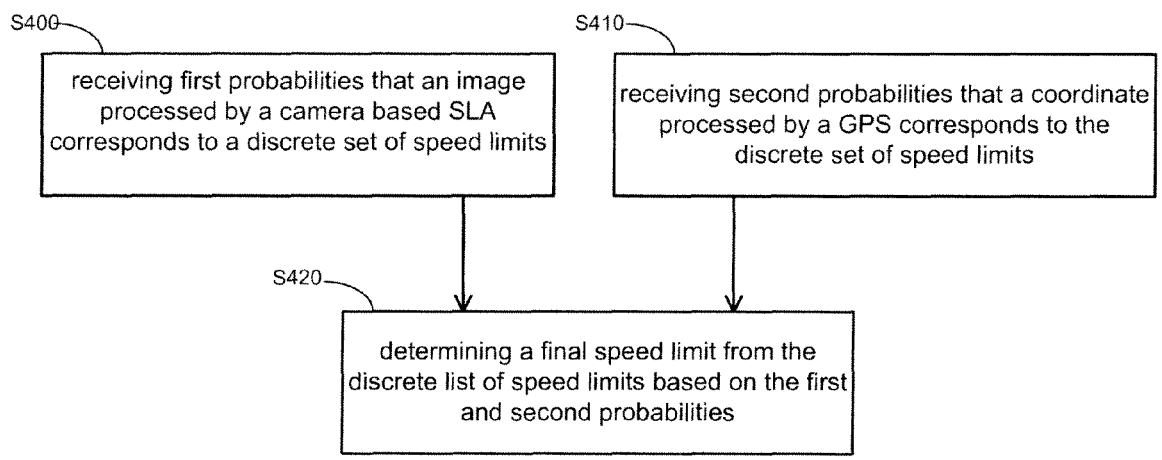
FIG. 4 illustrates a method of detecting a speed limit, according to an exemplary embodiment of the present invention.

FIG. 4 illustrates a method of detecting a speed limit, according to an exemplary embodiment of the present invention. Referring to FIG. 4, the method includes: receiving first probabilities that an image processed by a camera based SLA corresponds to a discrete set of speed limits (S400), receiving second probabilities that a coordinate processed by a GPS corresponds to the discrete set of speed limits (S410), and determining a final speed limit from the discrete list of speed limits based on the first and second probabilities (S420).

The second probability distribution may correspond to one of a discrete set of street types. The street type may have upper and lower boundary speed limits, and the probabilities of the second probability distribution that are outside the boundaries may be lower than the other probabilities of the second probability distribution. The street type may have a recommended speed limit, and the probabilities of the second probability distribution that are not equal to the recommended speed limit may be lower than the other probabilities of the second probability distribution.

The determining of the final speed limit may include performing a Bayesian fusion on the first and second probability distributions. The Bayesian fusion may include multiplying probabilities of the first and second probability distributions for each of the corresponding speed limits to generate product values, determining a highest one of the product values, and setting the final speed limit to the speed limit corresponding to the highest determined product value. The product values may be normalized before the highest one is determined.

Figure 5:
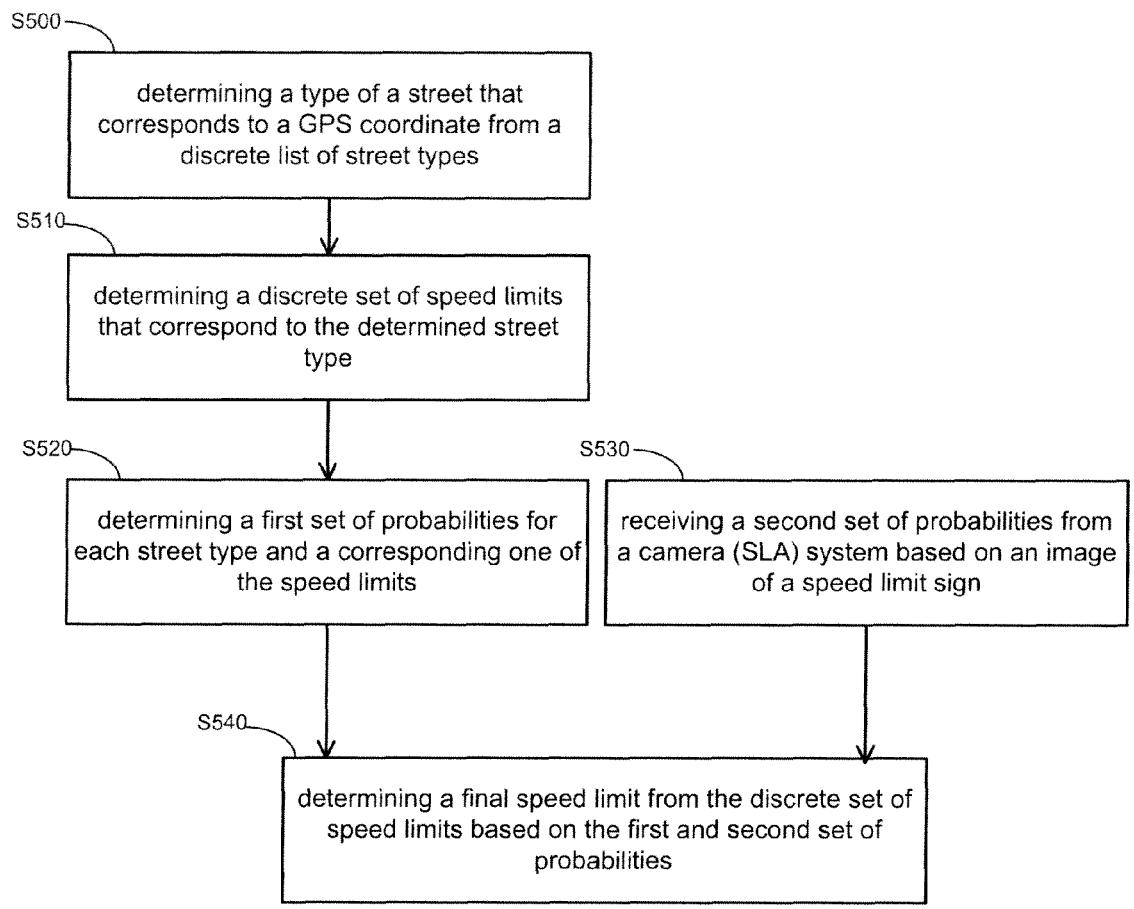
FIG. 5 illustrates a method of detecting a speed limit, according to an another exemplary embodiment of the present invention.

FIG. 5 illustrates a method of detecting a speed limit, according to an another exemplary embodiment of the present invention. Referring to FIG. 5, the method includes: determining a type of a street that corresponds to a GPS coordinate from a discrete list of street types (S500), determining a discrete set of speed limits that correspond to the determined street type (S510), determining a first set of probabilities for each street type and a corresponding one of the speed limits (S520), receiving a second set of probabilities from a camera (SLA) system based on an image of a speed limit sign (S530), and determining a final speed limit from the discrete set of speed limits based on the first and second set of probabilities (S540).

The determining of the final speed limit may include performing a Bayesian fusion on the first and second sets of probabilities. The street type may have corresponding maximum and minimum speed limit values, and the probabilities of the tuples including speed limits outside the minimum and maximum may be set to zero. The performing of the Bayesian fusion may include multiplying the first and second probabilities for each of the corresponding speed limits to generate product values, determining a highest one of the product values, and setting the final speed limit to the speed limit corresponding to the highest determined product value. The product values may be normalized before the highest one is determined.

Figure 6:
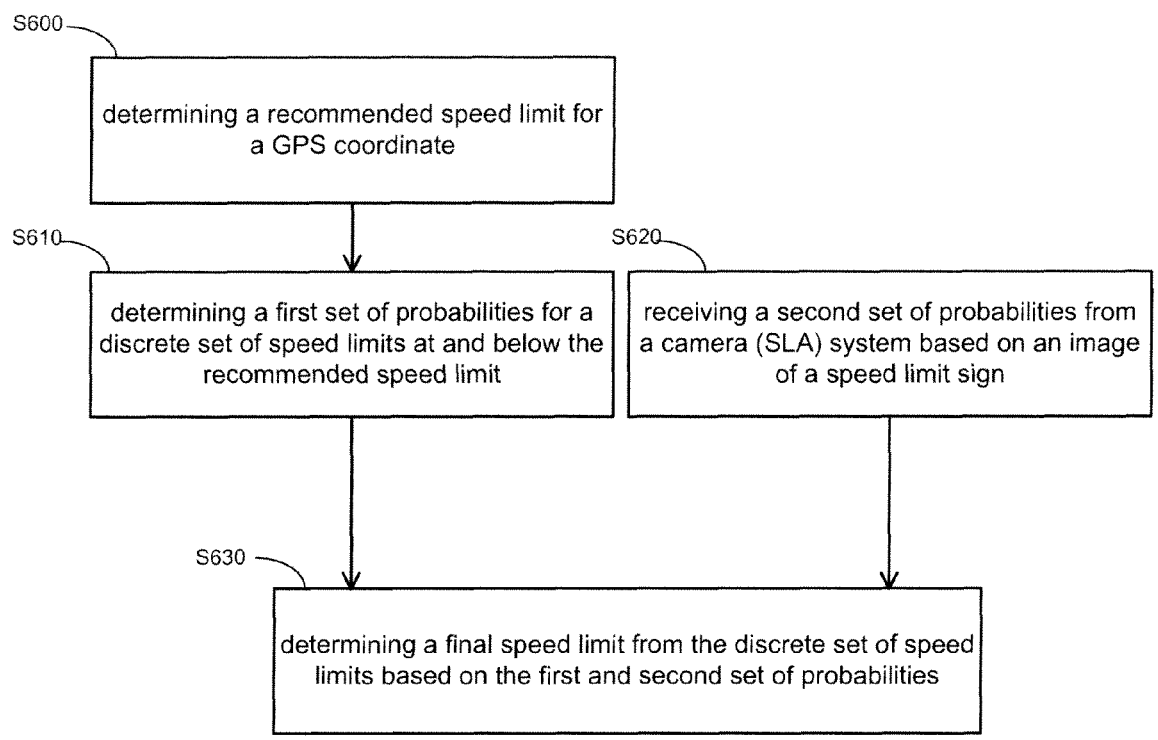
FIG. 6 illustrates a method of a method of detecting a speed limit, according to a further exemplary embodiment of the present invention.

FIG. 6 illustrates a method of detecting a speed limit, according to a further exemplary embodiment of the present invention. Referring to FIG. 6, the method includes: determining a recommended speed limit for a GPS coordinate (S600), determining a first set of probabilities for a discrete set of speed limits at and below the recommended speed limit (S610), receiving a second set of probabilities from a camera (SLA) system based on an image of a speed limit sign (S620), determining a final speed limit from the discrete set of speed limits based on the first and second set of probabilities (S630).

The determining of the recommended speed limit may include: determining a road segment from a table of road segments that corresponds to the coordinate, determining a type of the road segment, and determining the recommended speed limit from a table of recommended speed limits using the type. The determining of the final speed limit may include performing a Bayesian fusion on the first and second probabilities.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention.

What is claimed is:

1. A method of estimating a speed limit of a speed limit sign, the method comprising:
receiving, by a processor, at least one first tuple from a system having a camera configured to capture an image of a speed limit sign and process the image to generate the first tuples, wherein each first tuple includes an estimated speed limit of the sign and a probability that the estimated speed limit is correct;
receiving, by a processor, at least one second tuple from a global positioning system (GPS), wherein each second tuple includes a speed limit associated with a coordinate and a probability that the speed limit is correct; and estimating, by a processor, a final speed limit of the image of the speed limit sign by tuples performing a Bayesian fusion on the probabilities of the first and second tuples having the same speed limit, wherein the image is captured when a vehicle is in a first street segment and the fusion is delayed until the vehicle enters a second adjacent segment from which the coordinate is acquired.

2. The method of claim 1, wherein each second tuple corresponds to one of a plurality of street types.

3. The method of claim 2, wherein the street type has upper and lower boundary speed limits, and the probabilities of the second tuples having a speed limit outside the boundaries are lower than the probabilities of the second tuples having a speed limit within the boundaries.

4. The method of claim 2, wherein the street type has a recommended speed limit, and the probabilities of the second tuples having a speed limit not equal to the recommended speed limit are lower than the probabilities of the second tuples having a speed limit equal to the limit.

5. The method of claim 1, wherein the performing the Bayesian fusion comprises:
multiplying probabilities of the first and second tuples for each of the corresponding speed limits to generate product values;
determining a highest one of the product values; and
setting the final speed limit to the speed limit corresponding to the highest determined product value.

6. The method of claim 5, wherein the product values are normalized before the highest one is determined.

7. A method of estimating a speed limit of a speed limit sign, the method comprising:
determining, by a processor, a type of a street that corresponds to a coordinate from a global positioning system (GPS);
determining, by a processor, at least one speed limit that corresponds to the determined street type;
determining, by a processor, first probabilities for each tuple comprising the determined street type and a corresponding one of the speed limits;
receiving second probabilities from a system having a camera configured to capture an image of the speed limit sign and process the image to generate the second probabilities, wherein each second probability is mapped to a corresponding one of the speed limits; and
estimating, by a processor, a final speed limit of the image of the speed limit sign by combining the first and second probabilities for each same speed limit,
wherein the image is captured when a vehicle is in a first street segment and the estimating is delayed until the vehicle enters a second adjacent segment from which the coordinate is acquired.

8. The method of claim 7, wherein the combining comprises performing a Bayesian fusion on the first and second probabilities for each same speed limit.

9. The method of claim 7, wherein the street type has a corresponding maximum and minimum speed limit values, and the probabilities of the first tuples including speed limits outside the minimum and maximum are set to zero.

10. The method of claim 7, wherein performing the Bayesian fusion comprises:
multiplying the first and second probabilities for each of the corresponding speed limits to generate product values;
determining a highest one of the product values; and
setting the final speed limit to the speed limit corresponding to the highest determined product value.

11. The method of claim 7, wherein the product values are normalized before the highest one is determined.

12. A non-transitory computer readable medium, tangibly embodying a program of instructions executable by a processor to perform method steps for determining a speed limit of a speed limit sign, the method steps comprising:
determining a recommended speed limit for a first coordinate of a global positioning system (GPS);
determining first probabilities for speed limits at and below the recommended speed limit, herein each first probability indicates a likelihood that the corresponding speed limit is correct for the first coordinate;
receiving second probabilities from a system including a camera that captures an image of the speed limit sign and processes the image to determine the second probabilities, wherein each second probability indicates a likelihood that each of the speed limits corresponds to the speed limit sign; and
estimating a speed limit of the speed limit sign by combining the first and second probabilities for each same speed limit,
wherein the image is captured when a vehicle is in a first street segment and the first coordinate is determined by projecting a second coordinate from the GPS along the first street segment to a point along a second street segment adjacent the first.

13. The program storage device of claim 12, wherein the determining of the recommended speed limit comprises:
determining a road segment from a table of road segments that corresponds to the coordinate;
determining a type of the road segment; and
determining the recommended speed limit from a table of recommended speed limits using the type.

14. The program storage device of claim 12, wherein the combining comprises performing a Bayesian Fusion on the first and second probabilities for each same speed limit.

* * * * *